United States Patent
Shu et al.

(10) Patent No.: US 7,347,150 B2
(45) Date of Patent: Mar. 25, 2008

(54) NON-PLOWING METHOD FOR ESTABLISHING VEGETATION AND A NUTRIENT MATRIX THEREOF

(75) Inventors: Yang Shu, Guangzhou (CN); Kim Lun Kwan, Guangzhou (CN); Jinghang Wei, Guangzhou (CN); Fan Zeng, Guangzhou (CN)

(73) Assignee: Guangdong Golden Sand Eco-Protection, Inc., Guangzhou (CN)

( * ) Notice: Subject to any disclaimer, the term of this patent is extended or adjusted under 35 U.S.C. 154(b) by 0 days.

(21) Appl. No.: 10/604,380

(22) Filed: Jul. 15, 2003

(65) Prior Publication Data

US 2004/0149189 A1    Aug. 5, 2004

Related U.S. Application Data

(63) Continuation of application No. PCT/CN03/00401, filed on Jun. 2, 2003.

(30) Foreign Application Priority Data

Jun. 6, 2002    (CN) ................... 02115338

(51) Int. Cl.
*A01C 7/00*    (2006.01)
(52) U.S. Cl. .................. 111/199; 111/900; 47/56
(58) Field of Classification Search .......... 47/9, 47/56, 65.9; 111/900, 199
See application file for complete search history.

(56) References Cited

U.S. PATENT DOCUMENTS

| 3,704,544 | A | * | 12/1972 | Spanel et al. ............... 47/9 |
| 4,297,810 | A | * | 11/1981 | Hansford ................. 47/9 |
| 4,369,054 | A | * | 1/1983 | Shinholste et al. .......... 71/25 |
| 5,307,588 | A | | 5/1994 | Ullmann |
| 5,399,048 | A | * | 3/1995 | Walker, Jr. ............. 405/129.9 |
| 6,022,827 | A | | 2/2000 | Kumar et al. |
| 6,101,762 | A | * | 8/2000 | Courtabessis et al. ........... 47/9 |
| 6,141,993 | A | * | 11/2000 | Whitbeck ............. 66/195 |
| 6,185,864 | B1 | | 2/2001 | Lee |
| 6,324,781 | B1 | * | 12/2001 | Stevens ................. 47/9 |
| 6,523,299 | B2 | * | 2/2003 | Morris ................. 47/9 |
| 6,593,277 | B2 | * | 7/2003 | Adamoli et al. ........... 504/367 |
| 6,739,089 | B1 | * | 5/2004 | Behrens ............... 47/56 |
| 6,829,860 | B1 | * | 12/2004 | Lee et al. ............... 47/9 |

FOREIGN PATENT DOCUMENTS

| CN | 85103771 | 11/1986 |
| CN | 1055185 | 10/1991 |
| CN | 90101692.6 | 10/1991 |
| CN | 2343789 | 10/1999 |
| CN | 1316178 | 10/2001 |
| CN | 1318284 | 10/2001 |
| WO | WO 03/103370 A1 | 12/2003 |

OTHER PUBLICATIONS

International Search Report for PCT/CN03/00401, dated Jul. 10, 2003 (4 sheets) (English language).

* cited by examiner

*Primary Examiner*—Christopher J. Novosad
(74) *Attorney, Agent, or Firm*—James J. Zhu; Perkins Coie LLP

(57) ABSTRACT

The present invention relates to a non-plowing method for establishing vegetation on at least partially denuded land comprising the steps of: (a) laying out a continuous layer of nutrient matrix directly on said at least partially denuded land, said layer of nutrient matrix containing water and nutrient contents necessary for the growth of plants; (b) sowing plant seeds on the top surface of said at least partially denuded land before said layer of nutrient matrix is laid out, or sowing plant seeds into said layer of nutrient matrix after it is laid out, or mixing plant seeds with the constituents of said layer of nutrient matrix and laying out together with said layer of nutrient matrix; (c) establishing an artificial vegetable cover on said at least partially denuded land by supplying said plant seeds water and nutrient contents in said layer of nutrient matrix to sustain their growth. The method in the present invention requires no ditching and pitting, thus preserves the original topographic layer of a desert or arid land, and then can be widely used for its high survival rate and excellent vegetation performance.

12 Claims, No Drawings

NON-PLOWING METHOD FOR ESTABLISHING VEGETATION AND A NUTRIENT MATRIX THEREOF

CROSS-REFERENCE TO RELATED APPLICATION

The present application is a continuation of International Patent Application No. PCT/CN03/00401, filed Jun. 2, 2003, designating the United States of America, which claims the benefit of Chinese Patent Application No. 02115338.8, filed Jun. 6, 2002. The entire disclosures of both applications are fully incorporated herein by reference.

BACKGROUND

The present invention relates to a method for establishing vegetation and a nutrient matrix thereof. Particularly it relates to a non-plowing method for establishing artificial vegetable cover on at least partially denuded land and a nutrient matrix thereof.

According to a survey report from the State Forestry Administration of P. R. China on June 2000, total potential desertification areas hit 3.3 million $km^2$, taking up over 27% of the country's territory area. Direct economic loss caused by desertification reaches US$6.59 billion every year. Desertification is now expanding at a speed of 3,140 $km^2$ each year, and is still accelerating. In the past decades, the Chinese government has made great efforts in preventing and controlling desertification. Large amounts of funds were invested in planting trees or grasses and improving the ecological environment. However, the result is very unsatisfactory due to the atrocious weather of a desert and the backward methods of afforestation Millions of trees are planted every year but few remain alive.

Not only China is affected by desertification, but also many other countries and regions. To control the expansion of desertification and to improve desert or arid land as well as improving living conditions of human beings have become a common target of all human beings.

Almost all of the present methods for establishing vegetation are traditional methods, which unavoidably need digging pitches and pits, and then seedlings or seeds are planted in the pitches or pits. These methods have the following disadvantages: (1) Ditching and pitting will destroy the original surface, making the fragile sand surface even more vulnerable. Under human disturbance, those relatively immobile or semi-immobile sedimentary sands become mobile and drifting sands, therefore accelerating the speed of desertification; (2) Ditching and pitting are harmful to prevent wind, bind sand and retain water. Few seedlings planted in this way are able to survive because they are either covered by the sand or die because of drought. Such a method cannot be used to prevent sand from moving or to afforest a desert; (3) Ditching and pitting require intense labor and are low in work efficiency. With the above-mentioned methods, it is difficult to carry out sand treating and afforestation in a large scale, and the speed of afforestation may never catch up the speed of desertification.

U.S. Pat. No. 6,185,864 to Jay H. Lee provides a planting method and device thereof to grow plants by utilizing bags of growing medium. This method and system can promote growth of a planting element such as a seed, seedling, cutting, tuber or other planting generating material. The device used in U.S. Pat. No. 6,185,864 can promote root growth of a plant contained within the device into the topsoil contained in the bag into which the device is inserted, as well as into the soil or any other growing medium located below the bags. The disadvantage of the above method is that it needs digging the land surface to place the above device and therefore it is not suitable for establishing vegetation in a desert or arid land in a large scale for both its cost and the destruction of the original land surface.

U.S. Pat. No. 5,307,588 to Martin Ullmann provides a netting of cords which are connected to each other by knots or in any other suitable way and can carry seedlings in the form of sprouted or un sprouted seeds which are confined in and/or otherwise at least partly embedded in and/or simply adhered to the cords. The important advantages of such a netting are that it renders it possible to ensure uniform distribution of the seedlings over a selected terrain and that it shields the seedlings during the initial stages of growth subsequent to spreading out on a selected piece of land so that the seedlings are less likely to be eaten up by birds, mice and/or other animal. The disadvantage is that when such a netting is used to establish vegetation in a desert or arid land it can not contain enough water and nutrients necessary for growth of plants and can not prevent sands from moving or covering the seedlings and then can not ensure a high survival rate of plants.

Thus, a satisfactory solution to establish vegetation in a desert or arid land has not heretofore been found.

SUMMARY

The above object of the present invention can be accomplished by a non-plowing method for establishing vegetation on at least partially denuded land comprising the steps of: laying out a layer of nutrient matrix directly on said at least partially denuded land, said layer of nutrient matrix containing water and nutrient contents necessary for growth of plants; sowing plant seeds on the top surface of said at least partially denuded land before said layer of nutrient matrix is laid out, or sowing plant seeds into said layer of nutrient matrix after it is laid out, or mixing plant seeds with the constituents of said layer of nutrient matrix and laying out together with said layer of nutrient matrix; forming an artificial vegetable cover on said at least partially denuded land by supplying said plant seeds water and nutrient contents in said layer of nutrient matrix to sustain their growth.

With this method, the original topographic layer of said at least partially denuded land will not be destroyed or disrupted.

Another important object of the present invention is to provide a nutrient matrix which is suitable for establishing vegetation on at least partially denuded land through the above mentioned non-plowing method.

A further object of the present invention is to provide a nutrient matrix which can be laid out in a monolithic layer in a large scale.

The above two objects can be accomplished by a nutrient matrix comprising the following contents (in weight percentage): Biological materials 60–90%; Binder 5–20%; Water retentive agent 0.1–5%; Plant nutrients 2–15%, in which said biological materials can be selected from the group consisting of crop refuse, dejecta of animals, municipal waste which is separated from metal, plastic, glass and other undesired substance, and mixtures thereof. Said binder can be selected from the group consisting of starch, pre-gelatinized starch, modified starch, other polysaccharides, and mixtures thereof. Said plant nutrients refer to substances which contain nitrogen and/or phosphor and/or kalium, such as urea, phosphate fertilizer or compound fertilizer. In addition, said nutrient matrix may be mixed together with plant seeds.

DETAILED DESCRIPTION

According to the non-plowing method of the present invention for establishing vegetation a layer of nutrient matrix can be manually or mechanically laid out directly on at least partially denuded land without disrupting the original topographic layer of said land. During the laying process, the layer of nutrient matrix can be pressed and fixed, contacting closely with the original topographic layer of at least partially denuded land.

The nutrient matrix used in the above method is mainly composed of biological materials, that is, biological materials are used as its basic material. Said biological materials can be selected from the group consisting of crop refuse, dejecta of animals, municipal waste which is separated from metal, plastic, glass and other undesired substance, and mixtures thereof. Said biological materials may undergo fermentation, for example, pre-fermentation in high temperature heap. Said fermentation can be natural fermentation with a fermentation agent or heap fermentation without a fermentation agent. If applicable some biological materials such as humus can be used without fermentation.

For example, when used as the basic material of said nutrient matrix crop refuse or municipal waste is sorted, heaped, soaked and fermented, crushed and mixed, and then laid out with pressing, forming a layer of nutrient matrix with or without plant seeds.

According to the method of the present invention the particle size of the nutrient matrix or its basic material is associated with its volume weight, porosity, and gas/water ratio. The smaller the size is the more pores there will be in the nutrient matrix and the greater its water retention capacity will be. However, if the particle size is too small the gas permeability of nutrient matrix layer will also too poor, which will lead to hypoxia in plant roots, and thus hinder nutrient absorption. Experiments have demonstrated that the particles size of the nutrient matrix or its basic material is preferably between 3 meshes to 100 meshes, more preferably between 5 meshes and 30 meshes, and most preferably between 10 meshes and 20 meshes.

According to the present invention the volume weight of the nutrient matrix is the weight of the nutrient matrix in certain volume, usually measured in $g/cm^3$ (or $kg/m^3$). Under normal circumstances, large volume weight means smaller overall porosity, poorer gas permeability and poorer water absorption, which may not be beneficial to the development of plant root system. On the other hand, small volume weight of the nutrient matrix can affect the cohesion between the layer of the nutrient matrix and the land surface, consequently hindering the fixation of plant root system to land. Generally a low volume weight means below 0.5 $g/cm^3$, a medium volume weight is between 0.5 to 1 $g/cm^3$, and a high volume weight is above 1 $g/cm^3$. Experiments indicate that suitable volume weight (wet volume weight) of the nutrient matrix is 0.30–1.30 $g/cm^3$, preferably 0.40–0.90 $g/cm^3$, and more preferably 0.55–0.65 $g/cm^3$ According to the present invention, the overall porosity of the nutrient matrix=(1-volume weight/density)×100%. Larger overall porosity can hold more air and moisture and therefore is beneficial to the development of plant root system. Normally, the overall porosity of the nutrient matrix is 30–80%, preferably 40–70%, and more preferably 55–60%.

Gas/water ratio of the nutrient matrix mentioned above refers to the relative ratio between gas and water contained in the nutrient matrix, generally expressed by the ratio between the number of large pores and the number of small pores, in which the value of large pores is assumed as 1. The large pores will mainly contribute to storing gas, whereas small pores will mainly contribute to storing water. Gas/water ratio of the nutrient matrix in the present invention is preferably at 1:2–1:10, more preferably at 1:4–1:7. Such gas/water ratios will make the nutrient matrix not only have high water retention capability but also good gas permeability.

According to the method of the present invention said nutrient matrix may contain a binder to ensure that the layer of the nutrient matrix will substantially exist as a whole or as a monolithic layer after being laid out. The content of a binder in the nutrient matrix is dependent on several factors such as the kinds of biological materials used, the degree of fermentation as well as the particle size. Usually the content of a binder accounts for 5–20% of the total weight of the nutrient matrix. There is no specific limitation on the kind of a binder, so long as it demonstrates adhesive property for use with biological materials. Preferable binder is selected from the group consisting of starch, pre-gelatinized starch, modified starch, other polysaccharides and mixtures thereof.

According to the method of the present invention said nutrient matrix may also contain a water retentive agent. Water retentive agent can be compound resin which can absorb water, such as grafted cellulose and/or grafted starch by acrylic acid, acrylonitrile and/or acrylamide, which were described in Chinese patent application No. 85103771 and No. 90101692.6 and incorporated herein as references.

According to the present invention said nutrient matrix may contain nutrients necessary for plants, such as nitrogen and/or phosphor and/or kalium.

Plants seeds can be added into said nutrient matrix after said biological materials have undergone fermentation.

Said nutrient matrix may also contain softener so as to increase the flexibility of dried nutrient matrix, especially the flexibility of biological materials in dried nutrient matrix and thereby prevent breakage of the layer of the nutrient matrix during usage. For example, 1–10% of di-butyl phthalate can be added as a softener.

More preferably, the nutrient matrix used in the present invention comprises the following contents (in weight percentage): Biological, materials 70–80 wt %, Binder 6–10 wt %, Water retentive agent 0.3–2 wt. %, and Plant nutrients 4–10 wt. %, in which the particle size of said biological material is 5–100 meshes, preferably 10–20 meshes.

The following non-limiting steps and methods can be used to prepare said nutrient matrix of the present invention: (1) Collecting and sorting materials: Crop refuses such as wheat straws, rice straws, cornstalks, broomcorn straws, bean straws, rattan, bark, leaves, and grass, and/or dejecta of human, livestock and birds, and/or municipal wastes are collected and sorted. Plastics, metals and other undesired substance are separated from municipal wastes; (2) Stacking and making compost: The materials collected and sorted in step (1) are sprayed with fermentation agent and then piled up for natural fermentation until crop refuses turn black and soft, and dejecta and municipal waste become decomposed; (3) Crushing and mixing: The substance obtained in step (2) is mixed and crushed to desired specifications. The binder, nutrients and water are also mixed with a mixer and if seeds are mixed with the substance before laying out they can be uniformly distributed in it with a mixer; (4) Spreading or laying out: The substance obtained in step (3) which is mixed with or without plant seeds is laid out manually or mechanically to form a layer of nutrient matrix on at least partially denuded land. Said layer should be even in thickness and pressed to contact closely with the surface of at least partially denuded land.

The non-plowing method for establishing vegetation in this invention and the nutrient matrix thereof have the following outstanding characteristics and advantages: According to the present invention the surface of at least partially denuded land is covered by a layer of nutrient matrix, which can resist wind, bind sand, and retain water and fertilizer. Plant seeds can be mixed with or planted into said layer of nutrient matrix, and then sprout, develop rhizogenesis and grow under the protection of said layer of nutrient matrix. This method makes ditching and pitting unnecessary for either tree planting or grass planting. Planting and afforestation can be done without destroying the immobile or semi-immobile sedimentary topographic layer of at least partially denuded land.

The nutrient matrix of the present invention has excellent ability to bind sand, water and fertilizer, and resist wind. Without additional water supply the plant survival rate can reach 90% or higher. The nutrient matrix can be widely used for establishing vegetation on at least partially denuded land. Even under strong winds, the developed vegetable cover from said layer of nutrient matrix can still firmly hold to the ground.

Compared with common means of planting, labor intensity with the method of the present invention is lowered, and work efficiency is raised. After planting no watering, manuring and caring work are required. Therefore, it is a new and efficient way for preventing and controlling desertification which can be applied on a large scale.

According to the present invention, waste, such as crop refuses, dejecta of animals and municipal waste, can be turned into things of value. When the nutrient matrix of the present invention is laid out on the surface of a land, it is not only capable of binding sand, retaining water and growing plants, but also changing soil composition and making desert land suitable for plant growth.

A further understanding of the present invention, its various aspects, objects and advantages will be provided by the following examples.

EXAMPLE 1

A nutrient matrix and a layer of nutrient matrix can be prepared in the following process: 1) Crop refuses including rice straws, cornstalks, broomcorn straws, leaves and grass, and dejecta of livestock, and municipal wastes are collected and sorted. Plastics, metals and glass are separated from municipal waste. 2) The biological materials collected in step 1) are sprayed with fermentation agent and then piled up for natural fermentation until said crop refuses turn black soft, and said dejecta and municipal waste become decomposed. 3) The substance obtained in step 2) are crushed into particles of 10–20 meshes. On the basis of the total weight, add 6% of starch as the binder, 4% of urea as plant nutrients, and 0.5% of water retentive agent into the crushed particles. Then add water and mix. The finally obtained substance is the nutrient matrix of the present invention. Desired plant seeds are uniformly distributed into the obtained nutrient matrix with a mixer. 4) The nutrient matrix obtained in step 3) which is mixed with desired plant seeds is laid out manually or mechanically to form an even layer of nutrient matrix on at least partially denuded land in a thickness of about 2–5 cm. The laid layer of nutrient matrix should be pressed to ensure its close contact with land surface.

The tested physical and chemical properties of the above prepared nutrient matrix are as follows: its volume weight (wet) is 0.55–0.65 g/cm$^3$, its overall porosity is 55–60%, its gas/water ratio is 1:4–1:7, its N—P—K contents are total N 0.28, total P 0.24, and total K 0.74, its pH value is 6.5–7.0, its conventional water holding capacity is about 70%, and its saturated water holding capacity is about 120%. The water holding time of a layer of said nutrient matrix in thickness of about 3 cm is about 20–50 days. The consumed water amount for paving of said nutrient matrix is about 375 Ton/hectare (25 T/mu).

The above nutrient matrix can be used on an arid land, a semi-arid land, or a desertificated land with annual rainfall below 100 mm. It is preferably applied with drought-resistant and cold-resistant shrub seeds or grass seeds which can grow on a sandy soil.

EXAMPLE 2

A nutrient matrix is prepared in the same way as in Example 1, except that the particle size in step 3) is 15–35 meshes, 15% of modified starch is added as binder, 9% of urea and 4% of phosphor are added as nutrients, and the amount of water retentive agent is about 1.5%. The tested volume weight (wet) of the nutrient matrix in this example is 0.70–0.85 g/cm$^3$ with its overall porosity 40–55% and its gas/water ratio 1:5–1:8.

EXAMPLE 3

A nutrient matrix is prepared in the same way as in Example 1, except that the particle size in step 3) is 5–15 meshes, 8% of modified starch is added as binder, 5% of urea and 2% of phosphor are added as nutrients, and the amount of water retentive agent is about 1.0%. The tested volume weight (wet) of the nutrient matrix in this example is 0.45–0.60 g/cm$^3$ with its overall porosity 30–45% and its gas/water ratio 1:3–1:6.

EXAMPLE 4

A Trial Application of the Non-Plowing Method on 6.7 Hectares of Sandy Field in HuangYangTan HuangYangTan is located northwest of Beijing and belongs to Xuanhua County, Hebei Province, China. With a total area of 10,000 hectares and an average annual rainfall between 340–400 mm, HuangYangTan suffers from severe drought and evaporation. According to statistical data from 1961 to 1988, annual average evaporation of Xuanhua County was 1939.5 mm. The soil in the experimented area belongs to wind-sand-soil subclass with un-coagulated sand particles formed by wind-sand sedimentation, which is covered by little vegetation or is barren. The local forestry administrations had made great efforts to treat the sand, but were, for the most part, unsuccessful.

The nutrient matrix prepared in Example 1 was used to lay out a layer of nutrient matrix in thickness of about 3.5 cm for growing the vegetable cover. During the experiment period, winds blew everyday in HuangYangTan and the visibility was less than 100 meters due to flying sand. After a layer of nutrient matrix was laid out on the mobile sand surface, the sands were tightly covered and sand drifting was thus effectively controlled.

Plant Germination Under the protection of said layer of nutrient matrix *Caragana Korshinskii* sprouted in 8–10 days with a germination rate of 68%. *A. ordosica* Kraschen, *Tribulus terrestris* L, *Astragalus adsurgens* pall sprouted in 5–7 days, with germination rates of 71% for *A. ordosica* Kraschen, and 76% for *Astragalus adsurgens* pall. Some experimental data in HuangYangTai are shown in Table 1.

The experimental time for the methods in Table 1 is as follows: The experiment on the layer of nutrient matrix was conducted from Jul. 6, 2001 to Jul. 25, 2001.

The experiment on the straw net was conducted by the Forestry Administration of Xuanhua County in November 2001. In Jun. 5, 2002, the seeds of *A. ordosica* Kraschen began to sprout. By mid-June, they had grown to 5–7 cm. Because of the severe drought, all the seedlings were dried to death by early August. When examined on Dec. 24, 2002, all the seeds were found to be mildewed and rotten.

The experiment on bare dune was conducted by Guangzhou LvNengDa Ecology & Technology Research Institute in HuangYangTan from May 3, 2002 to May 28, 2002. Seeds were sowed under the moist sand in at a depth of about 5 cm. Ten days later about 20% of seeds were sprouted. However, when examined on May 28, 2003, none of these sprouts survived.

The data of the soil composition analysis and the data of the plant growth are shown in Table 2 and Table 3, respectively.

EXAMPLE 5

A trial application of the non-plowing method on 160 m² of Gobi Desert

The experiment of this Example was conducted on Gobi desert located in Yanchi Village, Gaotai County, Gansu Provice, China, which suffers from severe drought and violent wind with an average annual water precipitation below 300 mm. The experimented area was almost barren with only a few of *Artemisia desertorum* Spreng. Some kinds of shrubs and grasses had been planed by local peasants, but few survived due to lack of water for irrigation.

The nutrient matrix prepared in Example 1 was used to lay out a layer of nutrient matrix for growing the vegetable cover. Under the local weather conditions, the clover seeds in the layer of nutrient matrix sprouted in 5–7 days with a germination rate of about 95%, while *Tamarix. ramosissima* seeds sprouted in 8–10 days with a germination rate of about 93% and Seabuckthorn seeds sprouted in 10–12 days with a germination rate of about 94%.

During the experiment period all the above three kinds of plants grew exuberantly and their root systems developed rather well, with the clover growing to 23–62 cm, *Tamarix ramosissima* to 22–25 cm, and Seabuckthorn to 20–23 cm. The clover was in full growth. The roots of *tamarix ramosissima* penetrated into the sand to about 31–35 cm, while that of seabuckthorn to about 28–32 cm and that of the clover to about 15 cm. Analysis of these three plants are summarized in Table 4.

From Sep. 10, 1999 to Sep. 20, 2000 the experimental team continued to observe these plants after the planting. In this period of time the average heights of *tamarix ramosissima*, seabuckthorn and the clover were 83 cm, 75 cm and 50 cm, respectively. The leaves of *tamarix ramosissima* and seabuckthorn fell in winter, and they budded and turned green again in next late spring and early summer. The clovers withered in winter and revived in spring and summer, and their growth was similar to that in the planting period. In addition there was also a large amount of weeds in the experimental field.

Water Content Water content of the layer of nutrient matrix and the layer of sand 10 cm beneath said layer of nutrient matrix was measured twice. The first test was conducted at the early phase of one experiment (Jul. 6, 2001, sunny) and the water contents were 80% and 15%, respectively. The second test was at the end of said experiment (Sep. 8, 2001, cloudy) and the water contents were respectively 45% and 10%, compared with 0.05% for the layer of sand which was not covered by said layer of nutrient matrix.

Decomposition of the nutrient matrix The natural decomposition rate of the nutrient matrix was 0–5% in 30 days, 10–15% in 60 days, and 30% in 100 days.

In the present invention, organic refuses (including municipal wastes) are collected, crushed and mixed with binder, water, nutrients, plant seeds, etc. The obtained substance in such a way is laid out on the surface of at least partially denuded land manually or mechanically. The plant seeds in the layer of said substance will sprout, develop roots and grow. Since this layer contains a lot of plant fibre and nutrients and can not only effectively absorb natural precipitation but also prevent evaporation, it can supply abundant nutrients for the growth of plants. Meanwhile, this layer demonstrates strong adhering ability due to the existence of a binder. Therefore, it can also prevent wind and fix sand.

TABLE 1

Experimental Data of Germination Rate & Survival Rate

| Plant Method | A. ordosica Kraschen Germination Rate | A. ordosica Kraschen Survival Rate | Astragalus adsurgens pall Germination Rate | Astragalus adsurgens pall Survival Rate | Caragana Korshinskii Germination Rate | Caragana Korshinskii Survival Rate |
|---|---|---|---|---|---|---|
| Layer of nutrient matrix | 71% | 93% | 76% | 91% | 68% | 87% |
| Straw net | 35% | 0 | 0 | 0 | | |
| Bare Dune | 0 | 0 | 0 | 0 | | |

TABLE 2

Analysis of Soil Composition

| Content Position | N January 11 | N February 5 | P January 11 | P February 5 | K January 11 | K February 5 |
|---|---|---|---|---|---|---|
| Nutrient matrix | 0.25 | 0.057 | 0.48 | 0.35 | 0.1 | 1.48 |
| Sand under vegetable cover | 0.019 | 0.026 | 0.45 | 0.04 | 0.05 | 0.48 |
| Bare Dune | 0.018 | 0.02 | 0.39 | 0.018 | 0.02 | 0.39 |

TABLE 3

Comparative Data for Plant Growth (tested on Oct. 15, 2002)

| With a layer of nutrient matrix | Without a layer of nutrient matrix |
|---|---|
| Plant coverage: 100% | Plant coverage: 0 |
| Biomass: 45,000 kg/hectare | Biomass: 0 |
| Plant height: 55–133 cm | Plant height: 0 |

TABLE 4

Growth of Clover, *Tamarix ramosissima* and *Seabuckthorn*

| Tested item | Plant type | Growing time, days | | |
|---|---|---|---|---|
| | | 40 | 80 | 110 |
| Main haulm, cm | Clover | 15 | 42 | 62 |
| | *Tamarix ramosissima* | 8 | 17 | 25 |
| | Seabuckthorn | 6 | 16 | 23 |
| Main root, cm | Clover | 12 | 22 | 30 |
| | *Tamarix ramosissima* | 15 | 25 | 35 |
| | Seabuckthorn | 13 | 24 | 32 |

The invention claimed is:

1. A nutrient matrix which is used to form a layer of nutrient matrix on at least partially denuded land and to establish vegetation on said at least partially denuded land by a non-plowing method, comprising:
   Biological materials 60–90 wt. %
   Binder 5–20 wt. %
   Water retentive agent 0.1–5 wt. %
   Plant nutrients 2–15 wt. %
in which the particle size of said biological material is 3–100 meshes.

2. The nutrient matrix of claim 1, wherein said biological material is selected from the group consisting of crop refuse, dejecta of animals, municipal waste which is substantially separated from metal, plastic, glass, and mixtures thereof.

3. The nutrient matrix of claim 1, wherein said binder is preferably selected from the group consisting of starch, pre-gelatinized starch, modified starch, other polysaccharides and mixtures thereof.

4. The nutrient matrix of claim 1, wherein said water retentive agent is compound resin which can absorb water.

5. The nutrient matrix of claim 1, wherein said plant nutrients include nitrogen, phosphor and/or kalium.

6. The nutrient matrix of claim 1, wherein desired plant seeds are added into said nutrient matrix.

7. The nutrient matrix of claim 1, wherein the volume weight of said nutrient matrix is 0.30–1.30 g/cm$^3$; the overall porosity of said nutrient matrix is 30–80%.

8. The nutrient matrix of claim 1, wherein said nutrient matrix comprises
   Biological materials 70–80 wt. %
   Binder 6–10 wt. %
   Water retentive agent 0.3–2 wt. %
   Plant nutrients 4–10 wt. %
in which the particle size of said biological material is 5–30 meshes.

9. A non-plowing method for establishing vegetation on at least partially denuded land by utilizing the nutrient matrix according to claim 1, comprising the steps of:
   laying out a continuous layer of said nutrient matrix directly on said at least partially denuded land;
   sowing plant seeds on the top surface of said at least partially denuded land before said layer of said nutrient matrix is laid out, or sowing plant seeds into said layer of said nutrient matrix after it is laid out, or mixing plant seeds with the constituents of said layer of said nutrient matrix and laying out together with said layer of said nutrient matrix;
   establishing an artificial vegetable cover on said at least partially denuded land by supplying said plant seeds water and nutrient contents contained in said layer of said nutrient matrix to sustain their growth.

10. The method of claim 9, wherein the biological material in said nutrient matrix is treated by fermentation process.

11. The method of claim 10, wherein said fermentation process of said biological material is a natural fermentation in the presence of a fermentation agent.

12. The method of claim 10, wherein said plants seeds are added into said biological material after it has undergone said fermentation process.

* * * * *